Patented Nov. 19, 1946

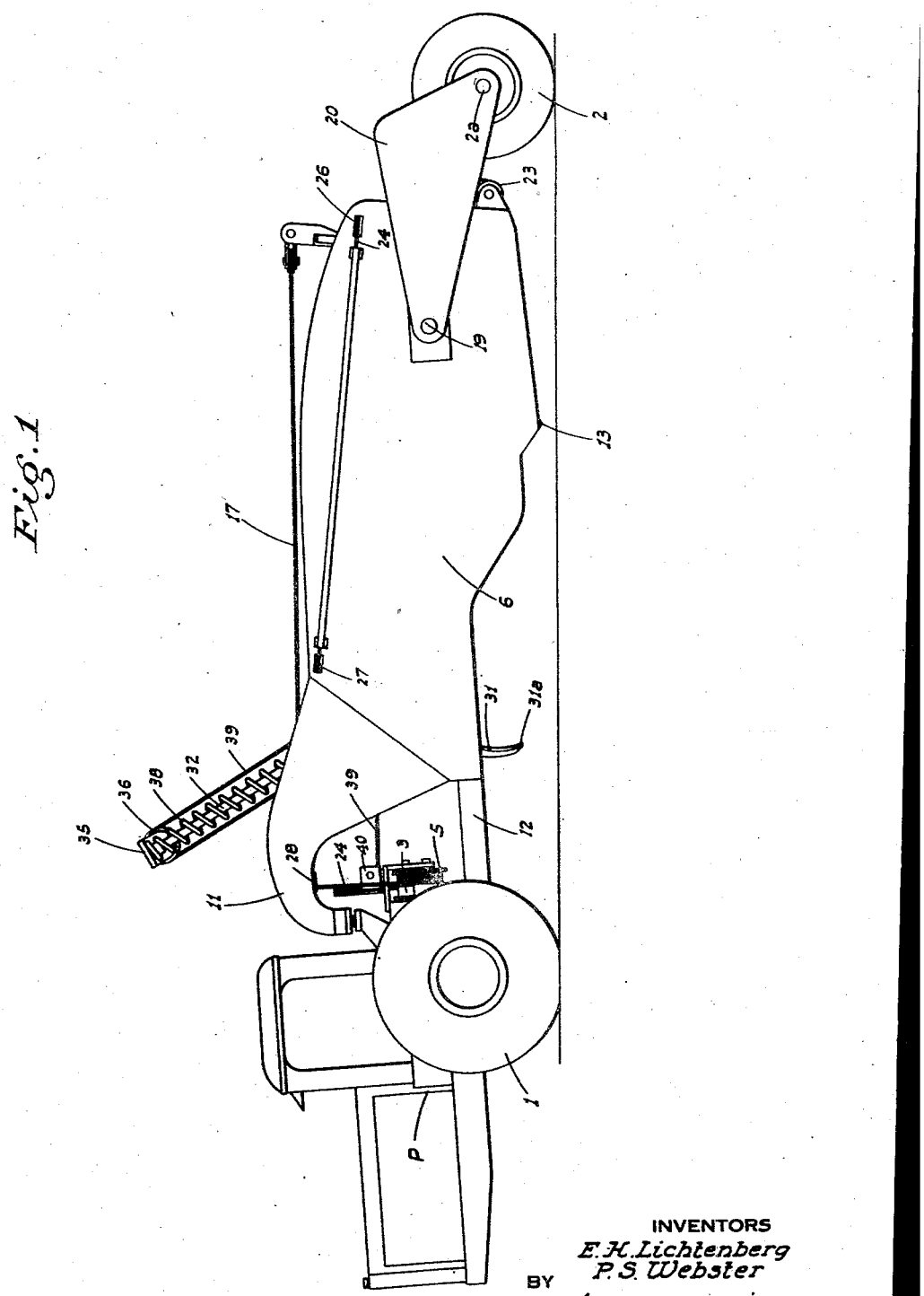

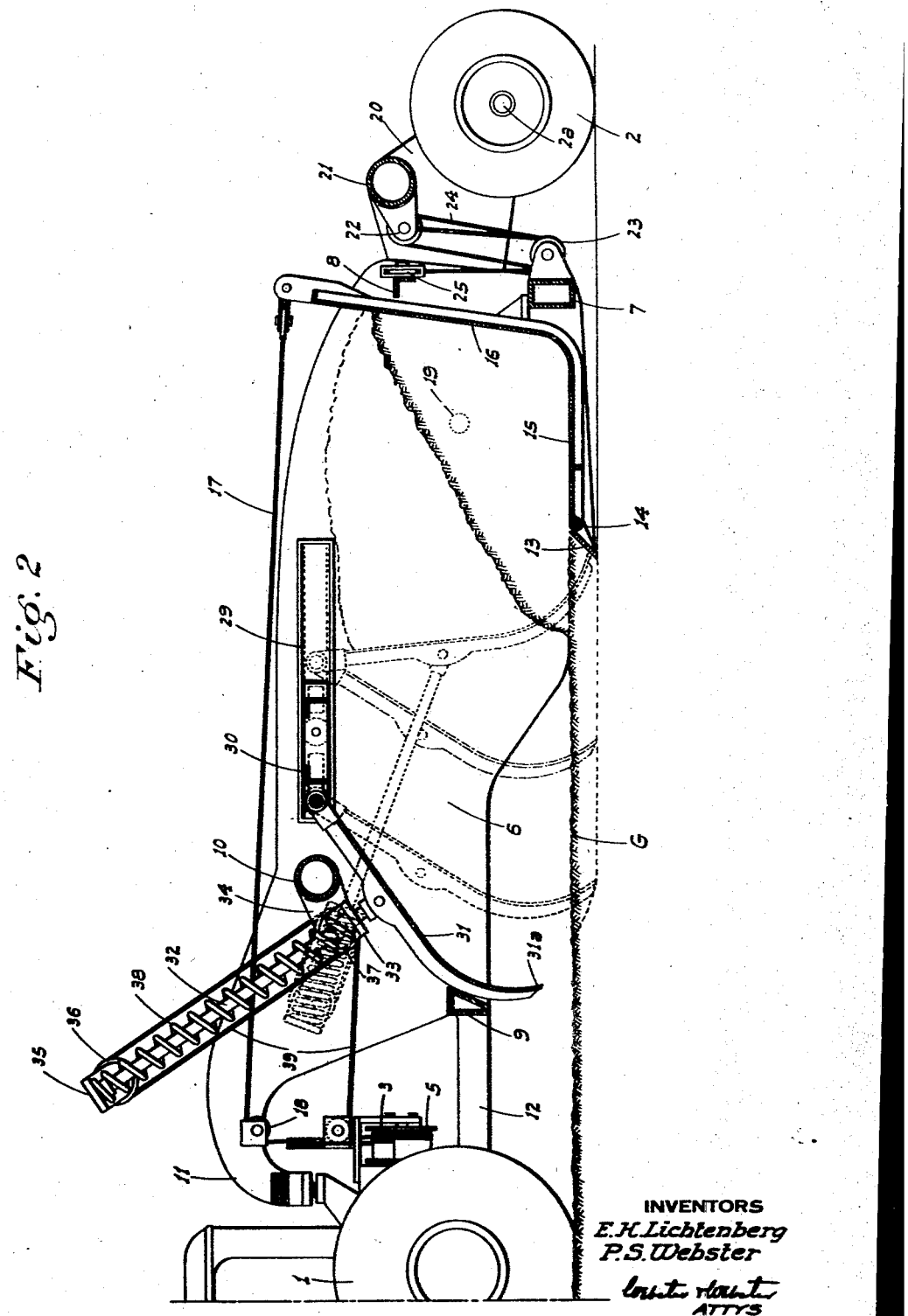

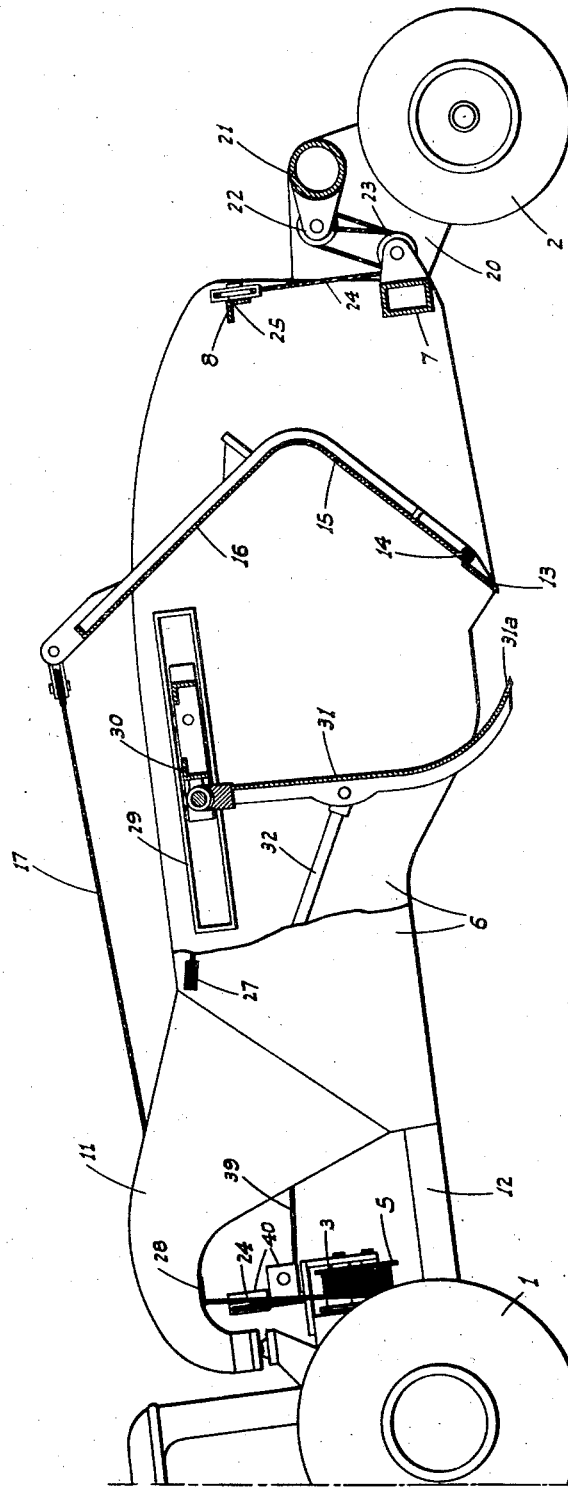

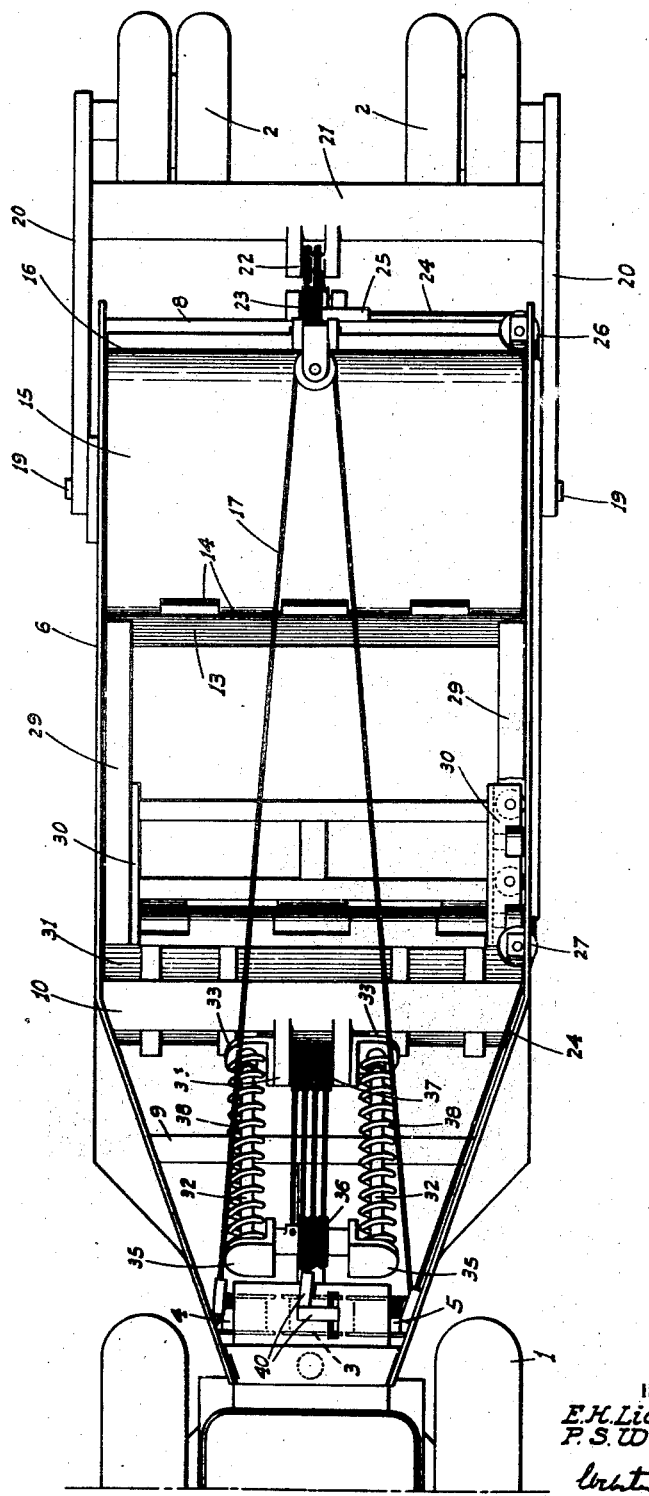

2,411,280

UNITED STATES PATENT OFFICE 2,411,280

SELF-LOADING SCRAPER

Erich H. Lichtenberg, Milwaukee, Wis., and Percy S. Webster, Stockton, Calif.; said Webster assignor to R. G. Le Tourneau, Inc., Stockton, Calif., a corporation Application June 6, 1944, Serial No. 538,960

3 Claims. (Cl. 37—126)

1

This invention relates generally to the earth moving art and is specifically directed to the conception of a self-propelled, self-loading scraper useful in digging, loading and transporting, unloading and grading earth and like materials.

In the art at the present time are so-called self-contained, self-powered wheeled scrapers. These comprise a scraper which, when loaded, is provided with its own power plant for propelling it from the point of loading, as distinguished from other types wherein the scraper is propelled, both for loading and transporting by a separate vehicle, such as a tractor and the like.

In both of these types of scrapers as at present employed, it is found necessary, in order to get a full load in the scraper, to employ a pusher tractor which pushes the scraper from the rear while it is being pulled from the front either under its own power or by the power of the separate vehicle.

The self-contained, self-powered scraper has a great advantage over the employment of a separate pulling unit in that, once the scraper is loaded, the speed of transport may be greatly augmented.

However, in order to gain this greater speed of transport, it is necessary to employ a relatively high horse power. For example, it takes roughly five million foot pounds to move a scraper having a capacity of fifteen cubic yards at a speed of from twenty to twenty-five miles per hour.

While a considerable amount of power is necessary for rapid transport of a scraper of this type, under the present character of construction and mode of operation thereof it is possible to use but a minor part of such power in loading, due to slippage of the driving wheels when the scraper meets the resistance of the ground as the cutting edge is dragged into the same. It therefore becomes necessary to augment the loading power by pushing the scraper from the rear with a separate tractor or the like.

The broad concept of our invention comprises the provision of a method and means whereby the same power which is necessary for rapid transport of a self-propelled scraper may be utilized to effectively load the scraper without the necessity of using a separate pusher. While this invention is directed primarily to such a self-propelled scraper, we do not desire to be understood as limiting ourselves to that type in particular, since the loading principle herein disclosed may be employed with the use of power

2 from a separate hauling vehicle where found adaptable.

These objects we accomplish by means of such structure and relative arrangement of parts as will fully appear by a perusal of the following specification and claims.

In the drawings similar characters of reference indicate corresponding parts in the several views:

Figure 1 is a side elevation of a diagrammatic outline of a self-propelled vehicle of a type referred to in the preamble to this specification to which we have applied the principle of our invention. The scraper here appears in unloaded position.

Figure 2 is a vertical longitudinal section showing in detail one suggested adaptation of our invention to a self-propelled scraper of the type shown in Fig. 2, and illustrating the sequence of operation of our novel loading means.

Figure 3 is a vertical longitudinal section of the scraper illustrating the parts as they appear after the scraper has been unloaded.

Figure 4 is a top plan view of the scraper as it appears before loading begins.

Referring now more particularly to the characters of reference on the drawings, the numeral 1 designates generally the front wheel mounted truck of the scraper, and 2 the rear wheel mounted truck.

On the front truck 1 is supported the power plant P of the scraper, which includes generally an engine, transmission, steering means, and the like, all of which are conventional and hence are not shown in detail, and which engine is provided with means to connect it to drive the wheels of the front truck 1, and also to selectively drive power drums 3, 4, and 5 respectively.

The scraper body proper may be of any conventional type, but we have shown it as comprising two side plates 6 connected at the rear by a bottom beam 7 and an upper beam 8.

The forward ends of the plates 6 are connected together by a lower beam 9 and an upper beam 10. At such forward ends the plates 6 are provided with a yoke 11 and a drawbar 12 suitably connected to the front wheel mounted truck 1. These connections are conventional so are not described in detail.

The main digging and load receiving portion of the scraper and which constitutes the load carrying bowl of the scraper may be selected from a number of available types to which our new invention may be adaptable. For the purposes of this description, however, we have selected that type wherein a fixed transverse cutting blade 13 is secured between the side plates, and back of which is hinged, as at 14, a unitary bottom element 15 and a back element 16 adapted to confine the load between them and the side plates 6, or to be tilted about the hinge 14 adjacent the cutting blade 13 to discharge the load as shown in Fig. 3. To accomplish this tilting action a cable 17 is suitably connected to the top of the back 16 and runs forwardly to and over a pulley 18 on the yoke 11 and then to the drum 4 which may be selectively connected to the power plant P by any conventional clutching means.

There are different ways in which the cutting blade 13 of the scraper may be lowered into and lifted from cutting and scraping position relative to the ground. In the form here shown the side plates 6 are pivoted at 19 to arms 20 fixed to the axle 2a of the truck 2. A cross beam 21 connects these arms adjacent their top edges and to the rear of the plates 6. A block of sheaves 22 is secured to this beam 21 and a block of sheaves 23 is secured to the beam 7 which connects the plates 6 adjacent their lower edges. A cable 24 is dead-ended to the sheave block 22 and then reeves around the sheaves 23, the sheaves 22, back to the sheave 23, then over a sheave 25 on the beam 8, thence around a sheave 26 at the rear of one side plate 6, along said plate and around a sheave 27 at the front end of such plate 6, thence over a sheave 28 on the yoke 11 and hence to the drum 5.

Power may be applied to the drum 5 from the power plant P through any conventional means. When operated to wind up the cable the distance between sheaves 22 and 23 will be shortened, thus lifting the rear of the plates 6 and carrying the blade 13 and connected parts clear of the ground. Release of the power from the drum 5 to allow the cable 24 to slacken will allow the sheaves 23 to drop away from the sheaves 22 so that the side plates 6 drop down and carry the blade into desired cutting position with respect to the ground G as shown in Fig. 2.

When in this position a forward drive of the scraper will cause dirt to be scraped over the blade 13 and into the bowl of the scraper encompassed by the side plates 6, bottom 15, and back 16. This action will continue until the resistance of the ground becomes so great that the traction wheels on the truck 1 begin to slip. This will occur before a capacity load is received into the scraper bowl, and it is at this point that it is now common practice to aid the continuation of the loading by pushing the scraper from behind with an additional tractor, usually of the track laying type. This, of course, necessitates having such a tractor standing by at all times, and hence requires that a fleet of scrapers be loading or the cost of handling the dirt becomes excessive. It is to obviate this condition that we have conceived of and developed our present invention in order to utilize the available power from the power plant P, not only to provide speed in transport of the loaded scraper, but also in the loading thereof so that a capacity load may be obtained without recourse to the additional pusher tractor.

While the broad concept of our invention may be executed in various ways, all within the scope of the appended claims, we here disclose one specific example thereof which we will now describe in detail.

On each of the plates 6 is mounted a carriage guide 29, slidable in each of which is a roller-mounted carriage 30. Pivotally mounted on these carriages is what may be termed a combination scraper blade and apron 31, movable between the side plates 6. The length of this member 31 is such that when the carriages 30 and such member 31 are in their rearmost position, the lower edge of the latter will substantially meet the cutting blade 13 to form a closure for the scraper bowl and retain the load of dirt therein. See Fig. 2. When the carriages 30 and member 31 are in their foremost position there will be a relatively large space between the cutting blade 13 and such member 31 and the latter will be clear of the ground level, even when the blade 13 is in scraping and digging position.

On the member 31 are push rods 32 movable through flanges 33 in spaced brackets 34 fixed to the beam 10, which is turnable between the side plates 6. At the outer ends of the push rods 32 are spaced bracket flanges 35 between which is secured a block of sheaves 36. A corresponding block of sheaves 37 is disposed between the brackets 34. Expansion springs 38 surround the rods 32 and act between the flanges 33 and 35 to normally hold the member 31 and carriages 30 in their foremost position.

A cable 39 is dead-ended on the sheave block 36 and is reeved around the pulleys in the blocks 36 and 37, and thence over fairlead pulleys 40 on the frame of the drum 3 and thence around the drum 3. When power from power plant P is applied to pull on this cable the sheave blocks 36 and 37 move toward each other. This forces the rods 32 forward and compresses the springs 38. This action first causes the member 31 to swing substantially to vertical position, and both it and the carriages 30 move rearwardly to bring the bottom edge of the member 31 adjacent the cutting edge 13. When the pull on the cable 39 is released and it is allowed to slacken, the springs 38 will expand and pull the carriage 30 and member 31 back to normal position.

The mode of operation of our novel construction and the novel function and result attained thereby will now be described.

When the scraper is to be loaded the cable 24 is slackened, which drops the scraper down so that the cutting blade 13 is in a position to be pulled into the ground in digging position. At this time the carriages 30 and member 31 are allowed to stand in full forward position so that the cutting edge of the member 31 clears the ground level.

Power from the power plant P is then applied to the wheels of the front truck 1 and the scraper is pulled forward. With this movement the blade 13 cuts into the dirt G and scrapes and loosens it. The scraped dirt tends to pile ahead of the blade 13 between the side plates 6, and as the scraper moves forward is pushed back into the scraper bowl.

This action continues until the resistance of the piled dirt to forward travel of the scraper is such that the traction wheels on truck 1 begin to spin and the scraper is therefore stalled. This usually happens before the scraper bowl is filled to capacity, and it is at this point that the pusher tractors are called into play. With our novel construction and method we avoid the use of the pusher tractor and still obtain a capacity load in the scraper, as follows:

When the scraper stalls, as described above, the power is disconnected from the wheels of the truck 1, with the cutter blade 13 still in cutting and digging position, and with the dirt piled up ahead of it between the side plates 6, as shown in Fig. 2 of the drawings.

The full power of the power plant P is then applied to the drum 3 to wind the cable 39 thereabout. The power is therefore transmitted through such cable, and connected parts, to the push rods 32. This action first moves the member 31 on an arc to bodily force its cutting edge 31a into the ground G to a depth at least as great as that at which the blade 13 stands at the time. (See dotted lines on Fig. 2.) Continued pressure of the rods 32 on the member 31 causes both it and the carriage 30 to move backward. As this occurs the member 31 scrapes dirt ahead of it toward the bowl of the scraper, and finally this dirt and that already piled ahead of the blade 13 is forced into the scraper bowl, giving it a capacity load, all as shown by dotted lines in Fig. 2. When this has been accomplished the member 31 may be held as a closure to retain the load in the bowl by keeping the cable 39 taut, or by holding the carriages 30 in their backmost position by any conventional latch, not shown, while releasing the tension on the cable.

The capacity loading of the scraper having been accomplished in the manner described, the drum 5 is then operated to wind up the cable 24 and lift the side plates 6 to the entire assembly out of engagement with the ground G and into transporting position. The power from power plant P is then connected to the driving wheels of truck 1 and the scraper transported to any desired point.

When that point is reached the tension or latch means holding the carriages 30 and member 31 is released and the expansion of the springs will cause the rods 32 to pull these members forwardly to release the load which may then be discharged by operation of the cable 17 to tilt the member 15—16 forwardly and force the dirt from between the side plates 6 and over the cutting blade 13 in the usual manner. The height at which the blade 13 is held will determine the depth to which the dirt will be spread and graded, as is usual in the scraper art.

From the foregoing detailed description it will be apparent that with the ample power available, put to use in the manner and through a mechanism of a character disclosed in our invention, a self-contained, self-loading scraper results which will completely obviate the necessity of the use of an independent pusher element of any kind in connection with the full loading of the scraper.

Throughout this specification and in the claims appended hereto wherever either the term "ground" or "ground level" is used it refers to the original ground surface, usually virgin and undisturbed soil, into which the cutting blades 14 and 31a must be lowered in order to cut and scrape the dirt to obtain the material to be loaded into the scraper. This ground is to be distinguished from the dirt which is bulldozed or dragged into an accumulated pile in front of the scraper. We make this distinction so that there will be no confusion between our invention, which contemplates a novel method and means of cutting into, and scraping up and loading this virgin soil; this being in contrast to certain prior art practices and structures which merely involve pushers or aprons adapted to push the pile of dirt, which accumulates ahead of the main scraper bowl, back into such bowl.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A scraper comprising front and rear wheel supported trucks, a frame mounted on said trucks, said frame including a main scraper bowl adjacent the rear end thereof, said bowl having a front cutting blade, means to raise and lower the bowl to carry the cutting blade into digging and scraping position in the earth, means to move the frame forwardly to cause the blade to dig and scrape earth and force it into the bowl, a carriage movable longitudinally on the frame forwardly of the main bowl, a digging and scraping element pivoted to the carriage and normally held out of engagement with the ground while the main scraper bowl is moving forwardly, and means to selectively move said element on its pivot into digging and scraping position and then moving the carriage toward the scraper bowl whereby said element will dig and scrape dirt and force it into the bowl.

2. The combination with a scraper bowl having frame extensions projecting forwardly thereof and a bottom cutting edge, means to lower and raise the cutting edge into and out of the earth, slide guides mounted in said extensions and terminating at one end adjacent the forward end of the bowl, a slide sliding in said slide guides, an apron pivoted on the slide, a cutting blade on the lower edge of the apron, means normally holding the apron retracted from the bowl and its cutting edge out of the earth, and means to selectively lower the apron cutting edge into the earth and then advance the apron toward the bowl.

3. The combination with a scraper bowl having frame extensions projecting forwardly thereof and a bottom cutting edge, means to lower and raise the cutting edge into and out of the earth, slide guides mounted in said extensions and terminating at one end adjacent the forward end of the bowl, a slide sliding in said slide guides, an apron pivoted on the slide, a cutting blade on the lower edge of the apron, means normally holding the apron retracted from the bowl and the cutting edge out of the earth, a bracket pivoted on the bowl extensions, a spring pressed rod movable through the bracket, the rod being connected with the apron and the spring functioning to hold the rod extended to hold the apron retracted from the bowl and its blade out of the earth, and means to move the rod against the compression of the spring and force the apron blade into the ground and then advance the apron toward the bowl.

ERICH H. LICHTENBERG.
PERCY S. WEBSTER.